(12) United States Patent
Bennett et al.

(10) Patent No.: US 11,493,400 B2
(45) Date of Patent: Nov. 8, 2022

(54) AUTOMATED DETERMINATION OF VALVE CLOSURE AND INSPECTION OF A FLOWLINE

(71) Applicant: Halliburton Energy Services, Inc., Houston, TX (US)

(72) Inventors: David B. Bennett, Conroe, TX (US); Antonio K. Acquaah, Humble, TX (US); Manish Vishwanath, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 4 days.

(21) Appl. No.: 16/623,128

(22) PCT Filed: Aug. 7, 2018

(86) PCT No.: PCT/US2018/045651
§ 371 (c)(1),
(2) Date: Dec. 16, 2019

(87) PCT Pub. No.: WO2019/032606
PCT Pub. Date: Feb. 14, 2019

(65) Prior Publication Data
US 2020/0173880 A1 Jun. 4, 2020

Related U.S. Application Data

(60) Provisional application No. 62/542,196, filed on Aug. 7, 2017.

(51) Int. Cl.
*G01M 3/28* (2006.01)
*E21B 47/117* (2012.01)
(Continued)

(52) U.S. Cl.
CPC ........... *G01M 3/2815* (2013.01); *E21B 34/00* (2013.01); *E21B 47/06* (2013.01); *E21B 47/117* (2020.05); *G01B 21/14* (2013.01)

(58) Field of Classification Search
CPC ...... G01M 3/2815; G01B 21/14; E21B 34/00; E21B 47/117
(Continued)

(56) References Cited

U.S. PATENT DOCUMENTS 6,993,963 B1    2/2006  Gudmundsson
2004/0163806 A1  8/2004  Hadley
(Continued)

FOREIGN PATENT DOCUMENTS

CA    2926288        4/2015
JP    2005201848 A1  7/2005
WO    2015057228 A1  4/2015

OTHER PUBLICATIONS

Math.com, "Derivatives: Min, Max, CriticalPoints . . . ," May 2000 [retrieved on Jul. 9, 2021], Retrieved from the Internet: < URL: https://web.archive.org/web/20000519040907/http://www.math.com/tables/derivatives/extrema.htm>. (Year: 2000).*
(Continued)

*Primary Examiner* — John H Le
(74) *Attorney, Agent, or Firm* — K&L Gates LLP

(57) ABSTRACT

The disclosed embodiments include systems and methods for recording a pressure profile using a sensor connected to a flowline, generating a pressure pulse in the flowline by closing a valve connected to the flowline, calculating a first derivative and a second derivative of the pressure profile, and determining a parameter of the pressure pulse based on the first derivative and the second derivative of the pressure profile.

16 Claims, 9 Drawing Sheets

(51) Int. Cl.
  *E21B 34/00* (2006.01)
  *E21B 47/06* (2012.01)
  *G01B 21/14* (2006.01)
(58) Field of Classification Search
  USPC .......................................................... 702/51
  See application file for complete search history.

(56) References Cited

U.S. PATENT DOCUMENTS

| | | | |
|---|---|---|---|
| 2005/0033530 A1 | 2/2005 | Stephenson et al. | |
| 2006/0059977 A1* | 3/2006 | Kates | G01M 3/2815 73/40 |
| 2006/0102346 A1 | 5/2006 | Casey | |
| 2008/0217006 A1 | 9/2008 | Casey | |
| 2010/0094144 A1* | 4/2010 | Doron | A61N 1/36564 600/509 |
| 2010/0313958 A1 | 12/2010 | Patel | |
| 2012/0103600 A1 | 5/2012 | Shako et al. | |
| 2012/0327742 A1* | 12/2012 | Kusko | G01V 1/137 367/25 |
| 2014/0002088 A1 | 1/2014 | Hudson et al. | |
| 2014/0305513 A1 | 10/2014 | Mcdowell | |
| 2017/0051843 A1* | 2/2017 | Azizgolshani | F16K 35/10 |
| 2020/0217276 A1* | 7/2020 | Nakagawa | F02M 25/0836 |

OTHER PUBLICATIONS

UMBC, "Units and Dimensionality," Aug. 2012 [retrieved on Feb. 4, 2022], Retrieved from the Internet: < URL: https://web.archive.org/web/20120808215845/https://www.csee.umbc.edu/portal/help/theory/units.shtml>. (Year: 2012).*

International Search Report and Written Opinion dated Nov. 28, 2018 for PCT Application No. PCT/US2018/045651 filed Aug. 7, 2018 (15 pages).

Gudmundsson, J.S., "Gas-Liquid Metering Using Pressure-Pulse Technology", SPE-56584, Houston, Texas, Oct. 1999, pp. 1-10.

"Successful Clean-out of Multi-Phase Export Pipeline from North Pacific Ocean to the Russian Shore", Deep Water Case Study, pp. 1-2.

Extended European Search Report dated Feb. 18, 2021 for EP Application No. 18844009.3, Aug. 7, 2018. 7 pgs.

World Oil's 1992 Tubing Tables, World Oil's 1992 Tubing Tables, 1992, 24 Pages, Gulf Publishing Co.

Gudmundsson, J.S., et al, Pressure Pulse Analysis of Gas Lift Wells, Nov. 12-13, 2001, 1-16, Nov. 12-13, 2001, ASME/API Gas Lift Workshop.

Markland AS, Trondheim, Better Assets Performance Pressure Pulse Allocation and Flow Assurance, 1, Markland AS, Trondheim, Norway.

Markland, AS, Trondheim, Pipeline Deposit Profiling Pressure Pulse Flow Condition Analysis, 1, Markland, AS, Trondheim, Norway.

Nenova, Bistra, et al, An Automated Algorithm for Fast Pulse Wave Detection, Nov. 15, 2010, 1-15, 141 (3) 203-216, Int. J. Bio Automation, 2010.

* cited by examiner

AUTOMATED DETERMINATION OF VALVE CLOSURE AND INSPECTION OF A FLOWLINE

BACKGROUND

Fluids can be produced from wells drilled into reservoirs. Various wellbore designs are used for different situations found in reservoirs. The complexity of well design has increased over the years, and deeper and more lateral wells have also increased the need for wellbore monitoring, including fluid flow, wellbore condition, and completion integrity. Furthermore, the flowlines that are used to convey fluid from the well may need to be monitored to ensure that the fluid flow is progressing properly.

Operators may measure conditions of a flowline or a wellbore, conditions such as fluid flow, using a logging tool. Such tools are primarily used to measure the downhole pressure, temperature, and fluid velocity. Other properties can also be measured using logging tools, depending on the particular wellbore condition or problem being investigated. Well operators may also install permanent pressure and temperature gauges at specific locations within the wellbore, but this can be an expensive option since the gauges are often not retrieved, and information from the permanent gauge may diminish in value over the life of the well.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The disclosed embodiments include improvements in processing the start time for a pressure pulse within a flowline.

Aspects of the present disclosure include improved time of flight measurements for the reflected pressure waves, for more accurate determination of the location of depositions or failures along the flowline. The time of flight measurements are improved, in part, by accurate selection of attributes associated with closure of a flowline valve, such as the start time of when the pressure pulse is generated. The improved accuracy in identifying the start time of the pressure pulse leads to better identifying the location of obstructions or failures along the flowline.

Figure 1:
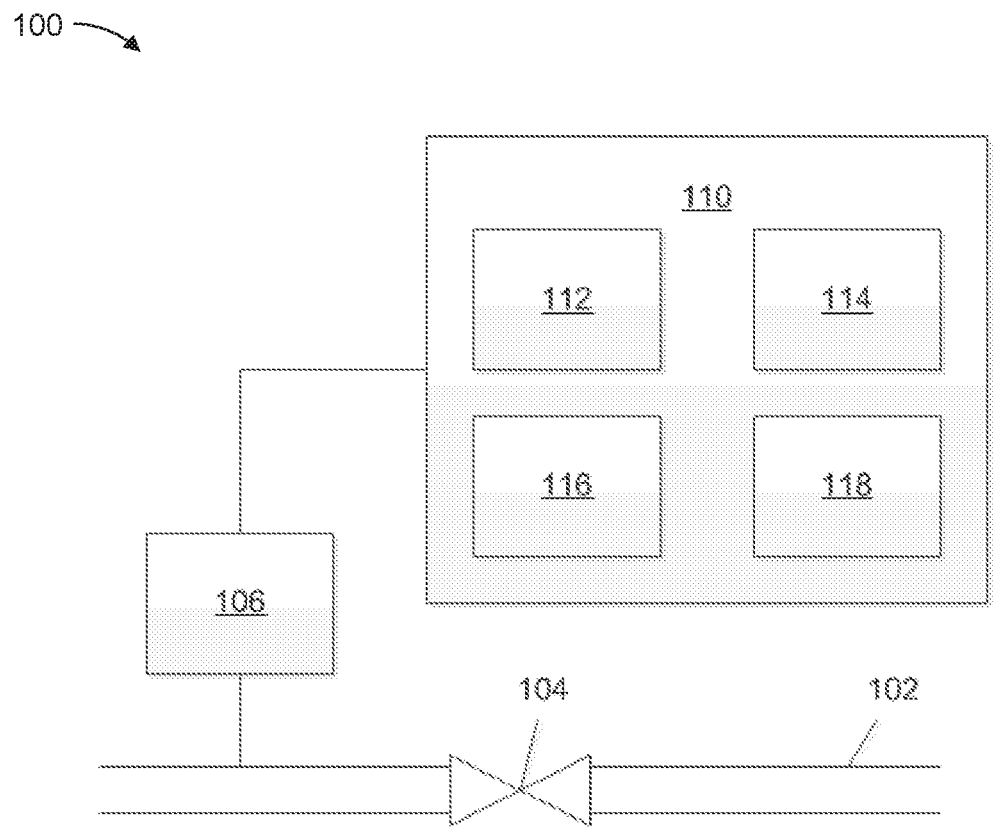
FIG. 1 depicts a schematic view of an example flowline inspection system, according to one or more embodiments.

FIG. 1 depicts a schematic view of a pipeline inspection system 100 according to one or more embodiments. The pipeline inspection system 100 is used to detect and locate various obstructions in or failures associated with a flowline 102 such as a pipeline or any suitable flowline used to carry a fluid. A pressure sensor 106, which may include a pressure gauge or transducer, is located immediately upstream or downstream from a valve 104 connected to the flowline 102. A computer system 110 may be in communication with the pressure sensor 106 to receive a pressure profile recorded by the pressure sensor 106. The pressure profile may be received as a pressure signal having a value per a given time. The valve 104 is closed to generate a pressure pulse in the flowline 102, and the pressure sensor records the pressure profile as the pressure value from the reflected pressure waves generated along the flowline 102. The valve 104 may be closed mechanically (e.g., by an actuator), or may be closed by hand (e.g., by an operator).

The computer system 110 may include one or more processors 112 and memory 114 (e.g., ROM, EPROM, EEPROM, flash memory, RAM, a hard drive, a solid state disk, an optical disk, or a combination thereof) capable of executing instructions. Software stored on the memory 114 governs the operation of the computer system 110. A user interacts with the computer system 110 and the software via one or more input devices 116 (e.g., a mouse, touchpad, or keyboard) and one or more output devices 118 (e.g., a screen or tablet). The computer system 110 is operable to analyze the pressure profile to identify a parameter of the pressure pulse, including a start time of the valve closure, an end time of the valve closure, a reference time of the pressure pulse, and a discard time of the pressure pulse.

The start time of the valve closure is the time at which valve closure is initiated. The reference time is the time at which the valve closure has closed to sufficiently generate an acoustical pulse for purposes of calculating the time of flight of the reflected pressure waves. The end time is the time at which valve closure is completed. The discard time is the time at which the pressure pulse reaches the end of the flowline or has attenuated to a degree that the pressure sensor can no longer adequately record the pressure value over a background level of the signal present within the flowline.

Figure 2:
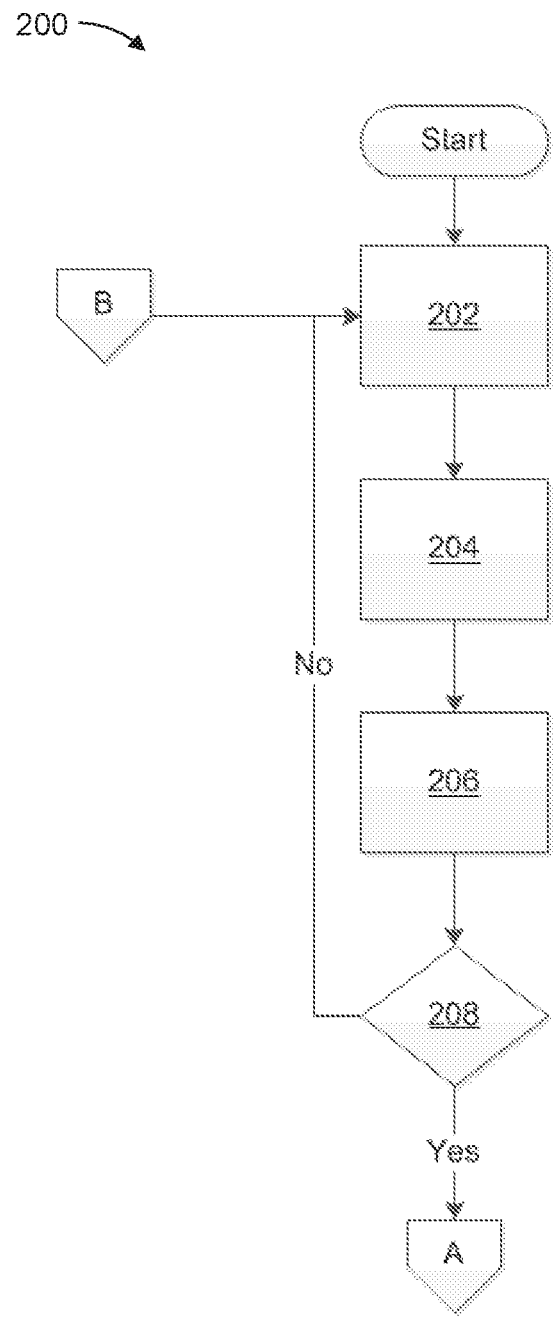
FIG. 2 depicts a flowchart of a flowline inspection method, according to one or more embodiments.
Figure 2:
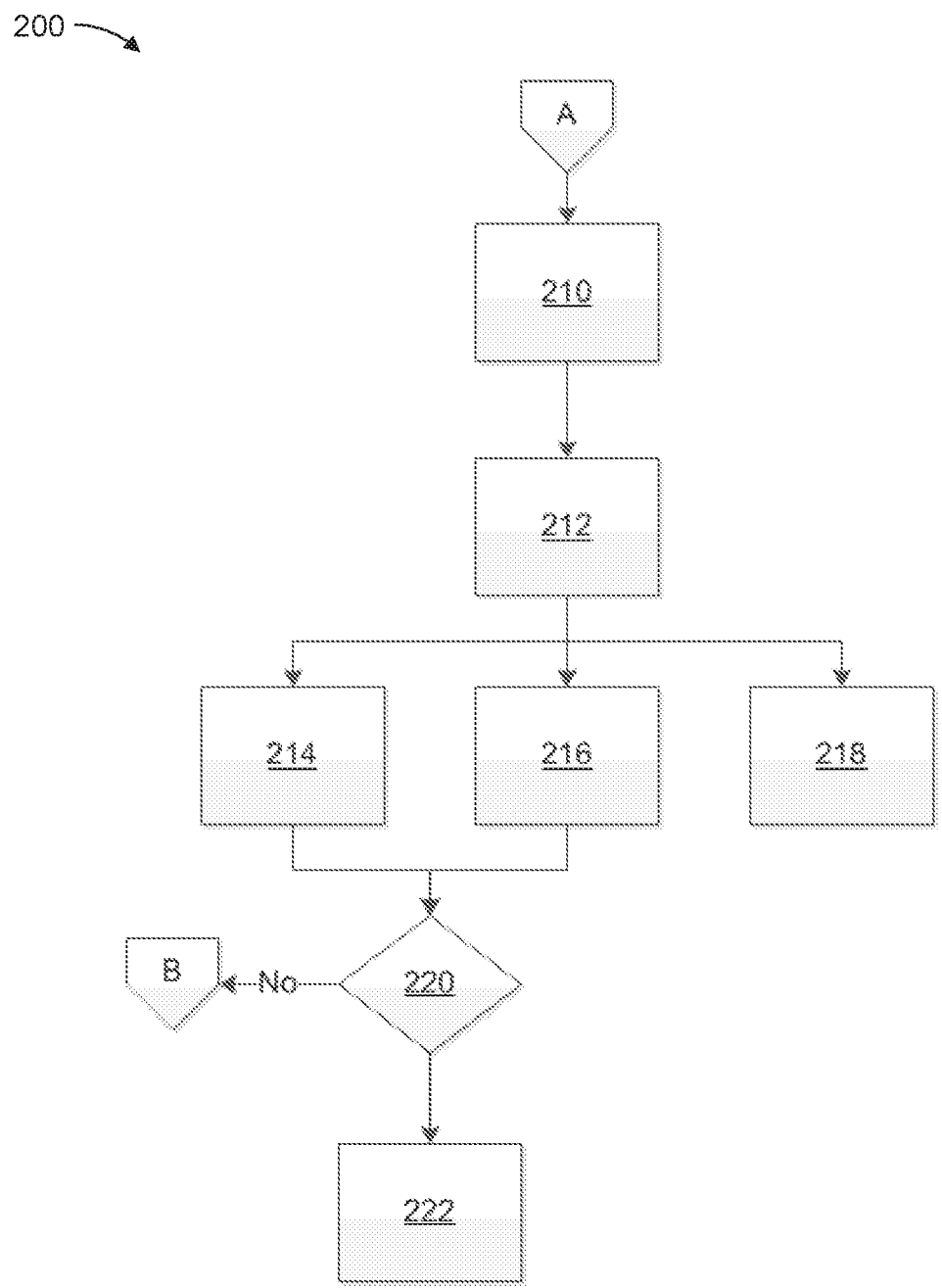
Figure 3:
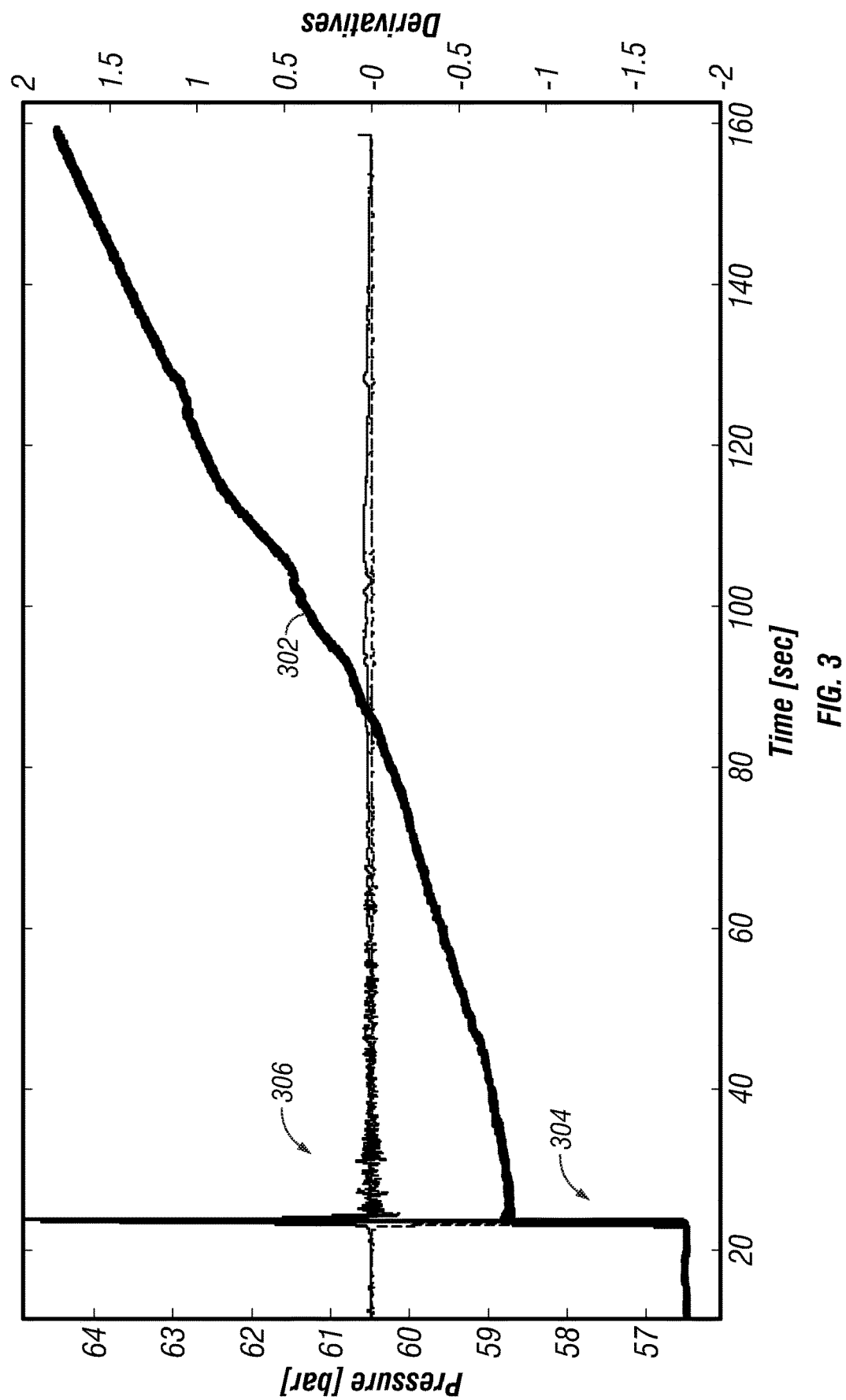
FIG. 3 depicts a graph view of a pressure profile, according to one or more embodiments.

FIG. 2 shows a flowchart of an automated method 200 of inspecting the flowline 102 according to one or more embodiments. At block 202, the pressure sensor 106 begins measuring the pressure inside the flowline 102 and the location of the sensor 106 is recorded. At block 204, the valve 104 is actuated to a closed position or a partially closed position to generate a pressure pulse in the flowline 102. As the pressure pulse travels along the flowline 102, pressure waves may reflect back to the pressure sensor 106 when the pressure pulse encounters any obstructions or failures along the flowline. For example, FIG. 3 depicts a graphical view of an outlet type pressure profile 302 recorded by a pressure sensor attached to a flowline, and the pressure change 304 after 20 seconds demonstrates when the valve was closed to generate the pressure pulse. In the case of an outlet, the pressure sensor 106 is positioned upstream from the valve 104. Referring to FIG. 2, at block 206, the pressure wave reflections are received at the pressure sensor 106 and recorded over time as the pressure profile.

The computer system 110 automates the analysis of the pressure profile to reduce the likelihood of misinterpreting the parameters in the pressure profile and improve the functionality of the processing method. The computer system 110 analyzes the pressure profile to identify parameters of the pressure pulse for use in identifying characteristics (e.g., valves, breaks, tools, solid/wax buildup) that may be present, or may develop in locations throughout the flowline 102. At block 208, the computer system 110 determines whether the valve closure is generated by an inlet or an outlet and whether the pressure pulse generates an adequate pressure change to analyze the pressure profile. The computer system 110 identifies pressure changes (drops or rises) that exceed threshold value (e.g., an increase of 10%) relative to the ambient pressure (background noise) level of the flowline 102. The ambient pressure of the flowline may be the average pressure observed during a time slice before a pressure pulse is generated in the flowline. The time slice may be about 0.1-1.0 seconds, or may be shorter or longer. If no pressure changes exist that exceed the threshold value, the flowline inspection may be repeated by returning to block 202 or flagged for review by an analyst, who is experienced at interpreting pressure profiles.

Upon identification of a pressure change, the first derivative and the second derivative of the pressure profile are calculated, at block 210, to identify parameters of the pressure pulse as further described herein. For example, a reference time, which is used to calculate the time of flight of the reflected pressure waves, may be identified in the pressure profile. Furthermore, a leveled time may also be identified and used to calculate the time of flight of the reflected pressure waves. Referring to FIG. 3, the first and second derivatives 306 of pressure profile 302 are the two curves that spike at the pressure change 304 and level out along the zero value of the right vertical axis. At block 212, the reference time and/or the leveled time of the pressure pulse are identified by evaluating characteristics of the pressure profile 302. The reference time is identified by finding the time associated with the peak value (i.e., highest value of a peak or lowest value of a trough) of the first derivative that occurs after the change in pressure used to identify a pressure pulse at block 208. The leveled time is identified by finding the time associated with a return to the threshold value of ambient pressure level as detected during the time slice.

Figure 4:
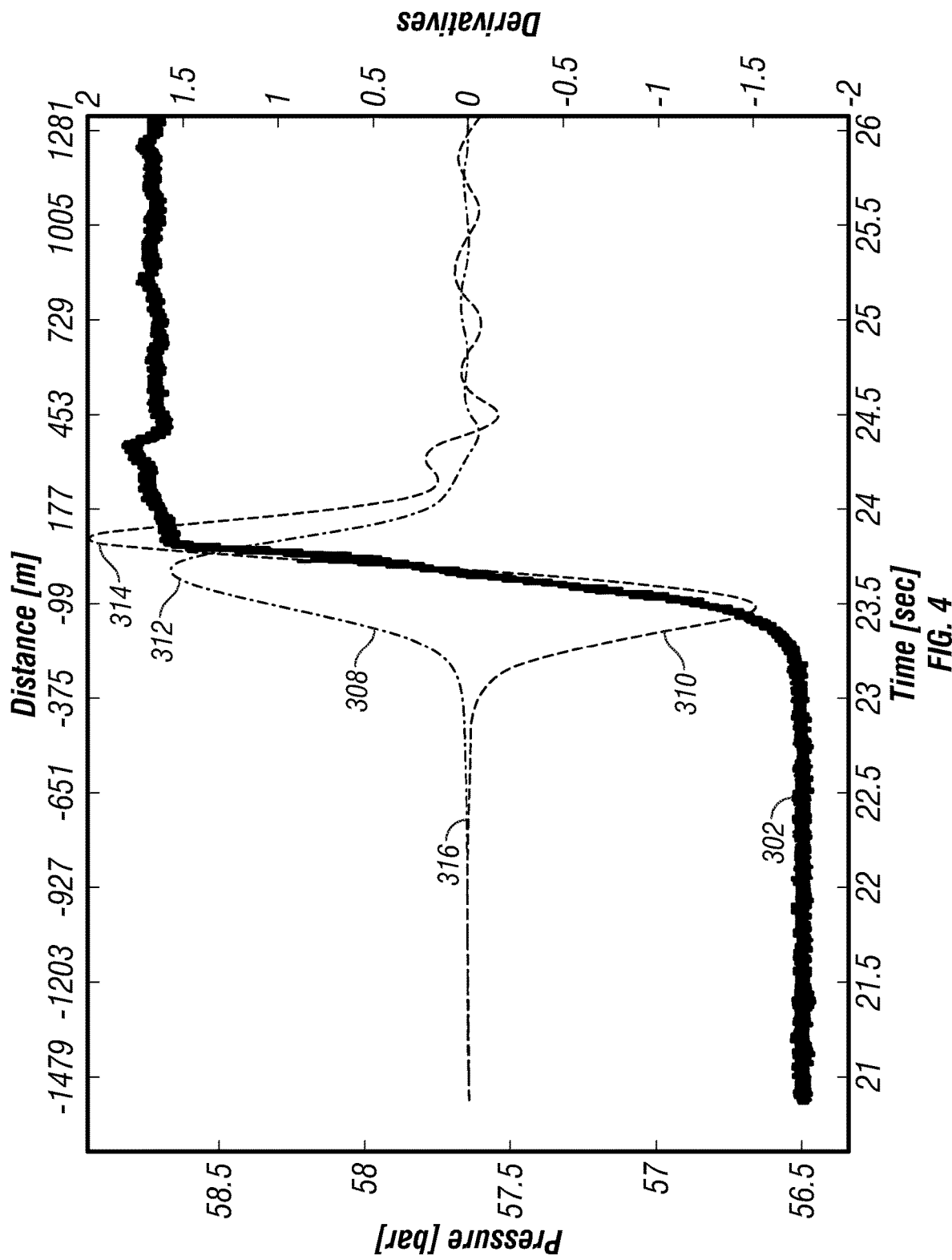
FIG. 4 depicts a zoomed-in view of the pressure profile of FIG. 3.

FIG. 4 shows a zoomed-in view of the pressure pulse depicted in FIG. 3, and the reference time 312 is identified as the peak value of the first derivative 308 encountered after the pressure change formed from the valve closure. For an outlet as depicted in FIG. 4, the peak value of the first derivative is a local maxima, whereas for an inlet the peak value of the first derivative is a local minima. At block 214, the end time 314 is identified as the time associated with the peak of the second derivative 310 which occurs immediately after the reference time 312. In addition to or alternatively, as described below with respect to FIG. 6, the end time may be identified with respect to the leveled time. The leveled time is identified by determining when the pressure value has stopped changing (i.e., leveled off) after the disturbance due to the generation of the pressure pulse. For example, if the first and second derivatives are zero plus-or-minus a small range for at least a certain time period, then the leveled time may be used to identify the end time, particularly if the valve closure is not perfect. A valve closure that is slow, non-uniform, or otherwise inconsistent may produce a pressure profile that has more peaks, and more peaks in the first and second derivatives. At block 216, the start time 316 is identified as the time at which the first and second derivatives 308, 310 separate enough from each other before the reference time and within the observed ambient pressure. For example, the start time may be identified by finding a difference of the first derivative and the second derivative that meets a threshold difference (e.g., 0.01) occurring before the reference time and within the ambient pressure. At block 218, the discard time may be identified as a separation of the first derivative and second derivative in association with the peak or trough pressure. The discard time may also be the time at which the pressure pulse reaches the end of the flowline 102, and thus, the discard time may also be calculated using the acoustic velocity of the reflected pressure waves and the length of the flowline 102 under inspection.

Upon identification of the start and end times of the pressure pulse, the computer system 110 may conduct a quality check of the pressure pulse. At block 220, the computer system 110 may determine the velocity of the valve closure, which may be used to determine whether the velocity of the valve closure is sufficient to generate a pressure pulse along enough of the flowline. The velocity of the valve closure may also indicate whether the valve properly sealed. The computer system 110 may also use a max valve closure time (end time minus start time), which may be set as 3 to 5 seconds, to determine whether the valve closed adequately to generate a pressure pulse. If the pressure pulse does not satisfy the quality check at block 220, the flowline inspection may be repeated at block 202 or flagged for review by the analyst.

The computer system 110 may also provide ratings for the valve closure to indicate whether valve closure is reliable for further analysis, needs review, or needs to be repeated. Green conditions, which indicate reliable results, may meet the following criteria: one peak of the first derivative during valve closure; one peak of the second derivative during valve closure, a pressure peak or trough is identifiable at the end of pressure profile with an associated separation of the first and second derivatives, the valve closure time is within the max closure time. Yellow conditions, which indicate that the results may need to be reviewed by an analyst, have one or more of the following conditions: two first derivative peaks during valve closure time, two second derivative peaks during valve closure, no pressure peak or trough is identifiable at the end of the pressure profile with associated separation of first and second derivatives, and the valve closure time is equal to the max closure time. Red conditions, which indicate that the recorded pressure profile may need to be rejected and the flowline inspection method may need to be repeated, have one or more of the following conditions: three or more first derivative peaks during valve closure, three or more second derivative peaks during valve closure timeframe, no pressure peak or trough is identifiable at the end of the pressure profile with associated separation of first and second derivatives, and the valve closure time exceeds the max closure time.

At block 222, the computer system 110 uses the reference time and the pressure profile to identify a tubular parameter characterizing the flowline 102. The tubular parameter may include any one or combination of an inflow into the tubular, a flowline collapse of the flowline, an effective diameter of the flowline, a deposit in the flowline, a leakage in the flowline, and a failure of the flowline. The computer system 110 also may determine the location of the tubular parameter along the flowline 102.

Figure 5A:
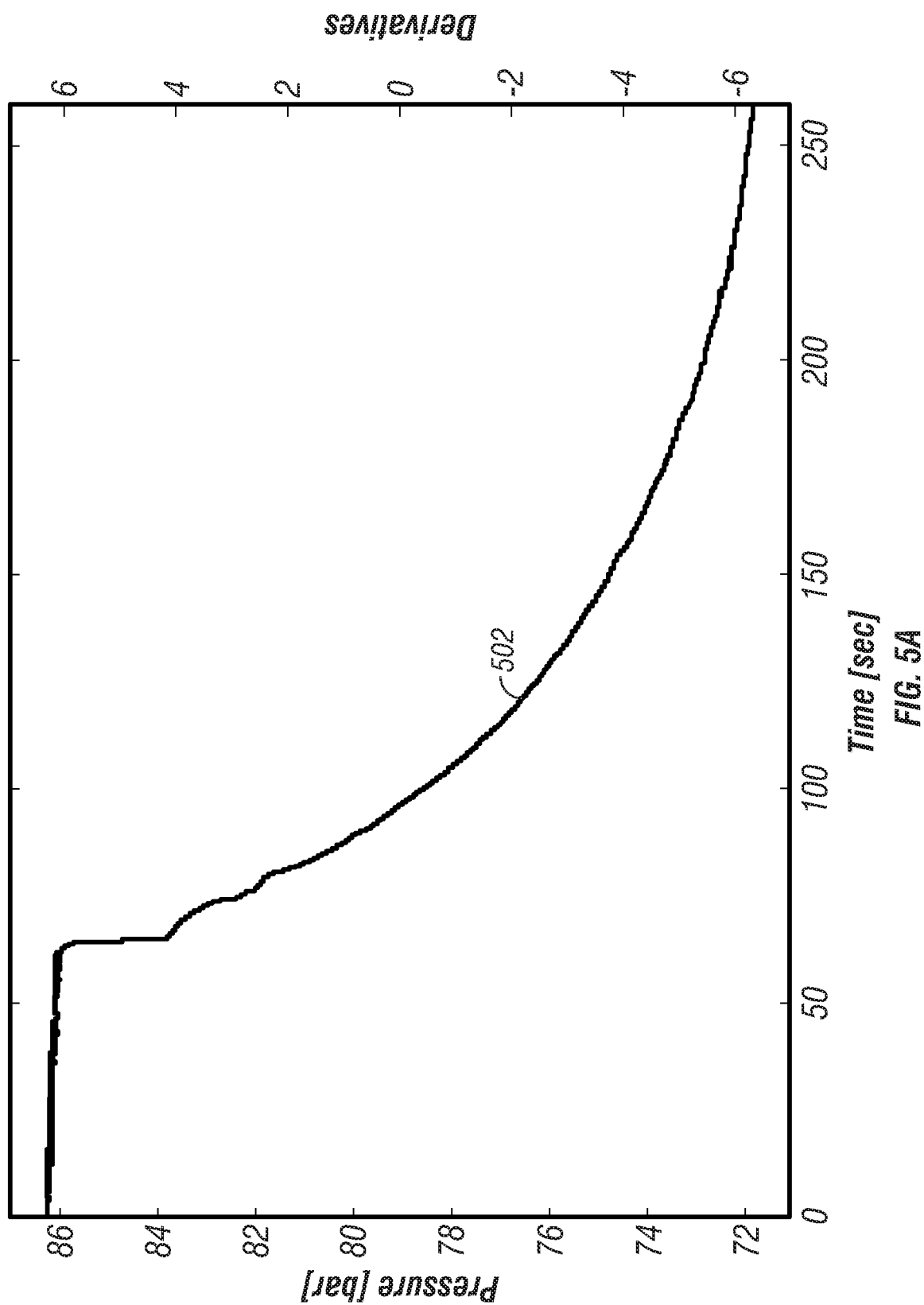
FIGS. 5A and 5B depict graph views of a pressure profile for an inlet, according to one or more embodiments, with FIG. 5B being a zoomed-in view of the imitation of the pressure pulse.
Figure 5B:
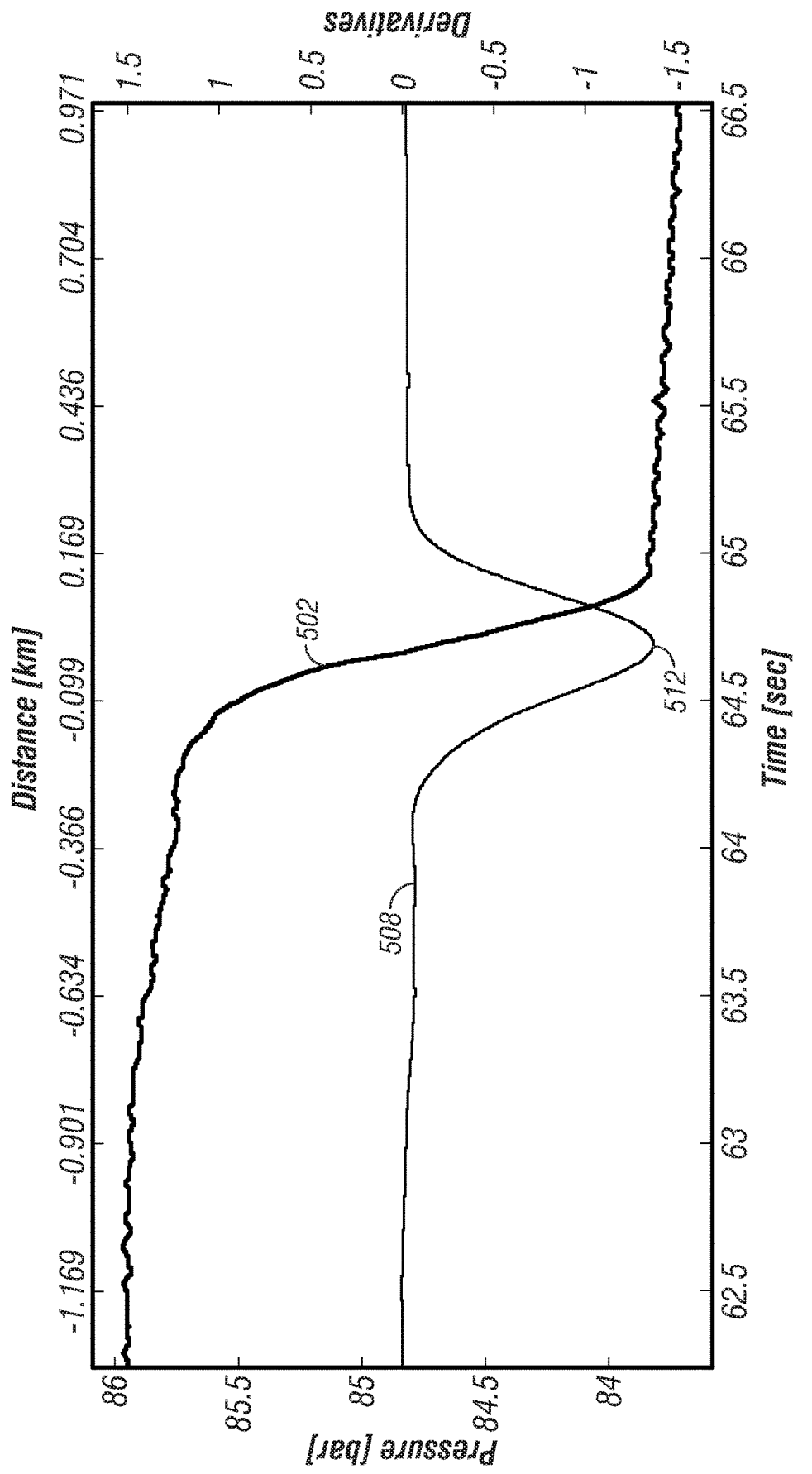

The flowline inspection method of FIG. 2 may also apply to inlet pressure profiles where the pressure sensor 106 is positioned downstream from the valve 104. For examples, FIGS. 5A and B show graph views of a pressure profile 502 generated from a valve closure of an inlet according to one or more embodiments. FIG. 5B is the zoomed-in view of the imitation of the pressure pulse. The inlet pressure profile produce a pressure drop rather than the pressure rise depicted in FIG. 3. The first derivative curve 508 demonstrates that the reference time 512 may be identified as the local minima rather than the local maxima of FIG. 4, and a similar adjustment in the flowline inspection method may be applied to identifying the local minima for the end time.

Figure 6:
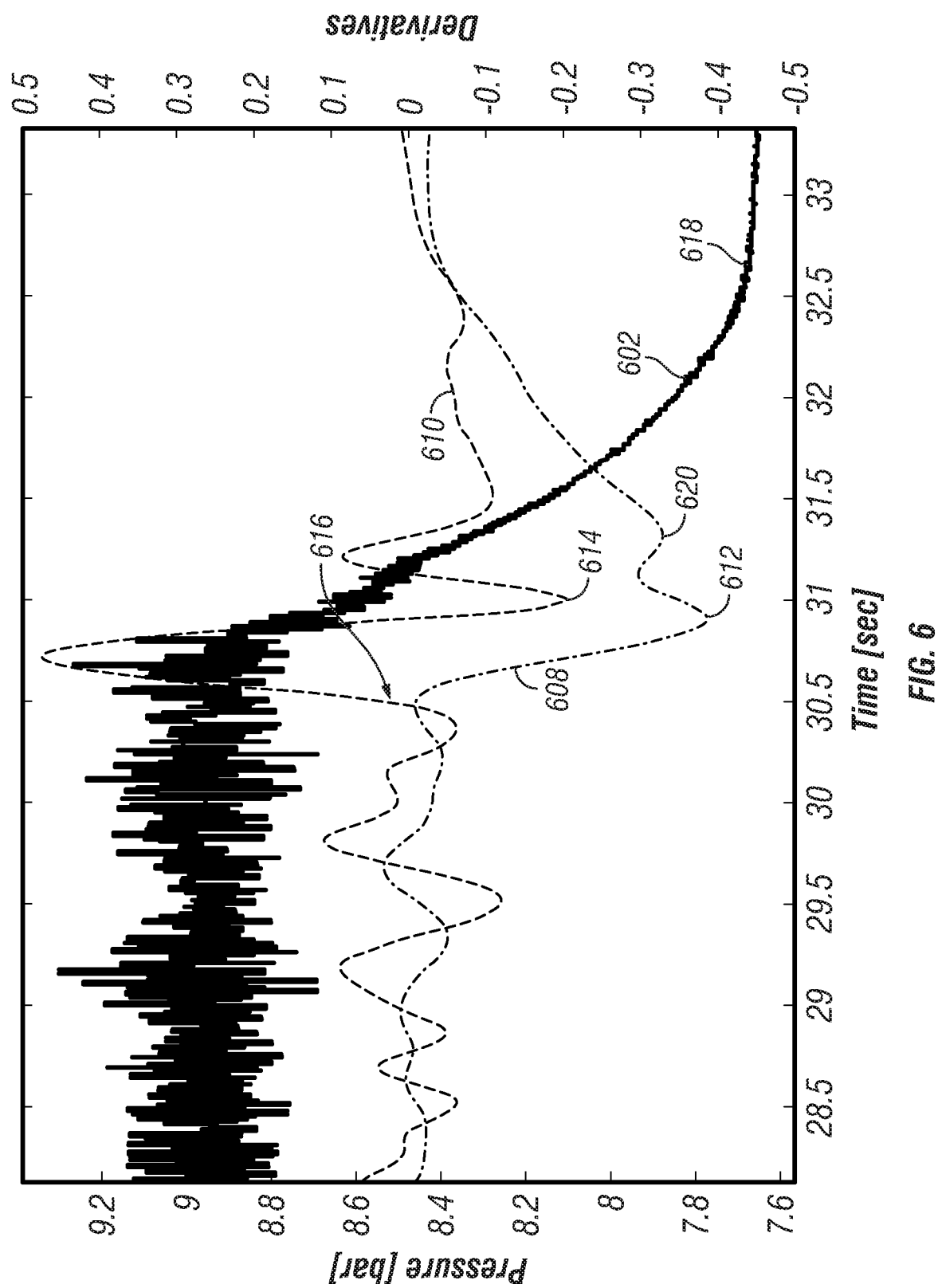
FIGS. 6 and 7 depict graph views of complex pressure profiles.
Figure 7:
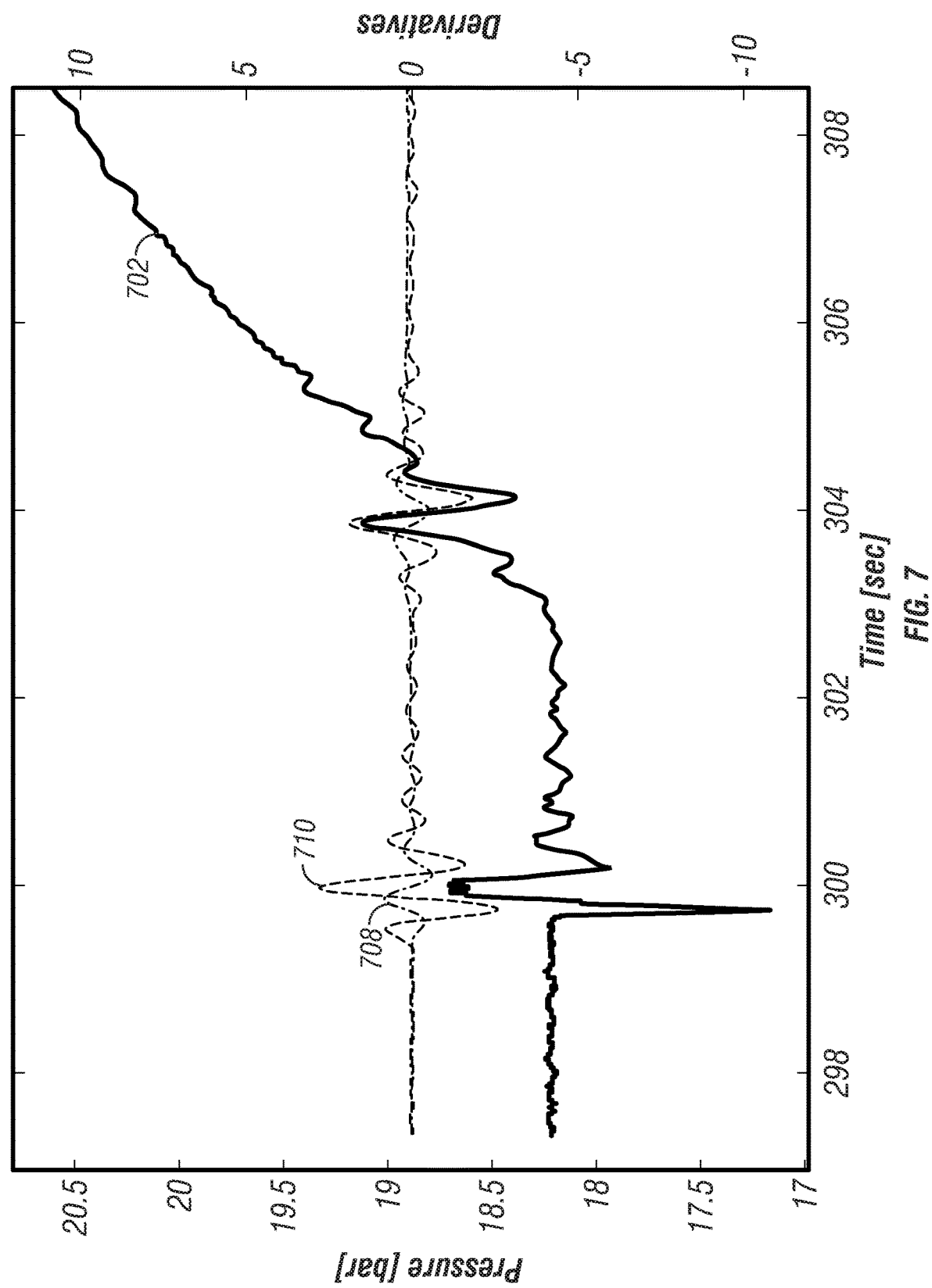

FIGS. 6 and 7 show graphs of zoomed-in views of other example pressure profiles 602, 702 that benefit from the automated flowline inspection method 200, in accordance with one or more embodiments. FIG. 6 shows a pressure profile 602 which exhibits multiple peaks along the curves for the first and second derivatives 608, 610. Without the automated approach of identifying the parameters of the pressure profile described herein using the computer system 110, the pressure profile depicted in FIG. 6 is prone to misinterpretation. For example, the wrong peak for the reference time or end time may be identified among the multiple peaks. The computer system 110 may identify the reference time 612, the start time 616, and the end time 614 as being located along the first and second derivatives 608, 610 based on the automated identification method described with respect to FIG. 2. In certain embodiments, however, a leveled time 618 may be used to determine a true end time 620. For example, the true end time 620 is determined as the last peak of the first derivative 608 before the leveled time 618. Thus, the automated identification method described herein provides an accurate and efficient technique of identifying the pressure pulse parameters for complex pressure profiles with multiple peaks in the curves for the first and second derivatives.

FIG. 7 also depicts a pressure profile 702 exhibiting multiple peaks along the curves for the first and second derivatives 708, 710, and with a high potential for misinterpretation without the automated inspection method described herein. The pressure change initiated near 300 seconds can be misinterpreted as a faulty valve closure, which leads to the next pressure change closer to 304 seconds being misinterpreted as the valve closure for purposes of determining the parameters of the pressure pulse. The automated inspection method described herein, however, identifies the pressure change initiated near 300 seconds as the valve closure because there is a greater pressure change closer to the ambient pressure level. The pressure fluctuations observed near 304 seconds were verified to be deposits in the flowline.

This discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A method, comprising:
measuring a pressure profile using a sensor connected to a flowline;
generating a pressure pulse in the flowline by closing a valve connected to the flowline;
calculating a first derivative and a second derivative of the pressure profile from the valve closure;
determining a parameter of the pressure pulse based on the first derivative and the second derivative of the pressure profile, the parameter including at least a reference time of the valve closure;
measuring a change in the pressure profile with the sensor due to a pressure wave reflected back to the sensor from a flowline parameter characterizing the flowline;
determining the flowline parameter and the location of the flowline parameter along the flowline using the parameter of the pressure pulse and a time of flight of the reflected pressure wave from the reference time.

2. The method of claim 1, wherein the parameter further comprises any one or combination of a start time of the valve closure, an end time of the valve closure, and a discard time associated with the pressure pulse.

3. The method of claim 2, further comprising:
identifying the reference time by finding a peak value of the first derivative following a change in pressure that exceeds a threshold value;
identifying the start time by finding a time before the reference time where a change in the first derivative on a time scale meets a first threshold value and a change in the second derivative on the time scale meets a second threshold value;
identifying the end time by finding a peak of the second derivative occurring after the reference time; and
identifying the discard time by finding an additional separation of the first derivative and the second derivative that meets an additional threshold hold value occurring after the reference time.

4. The method of claim 1, further comprising identifying a change in pressure, which exceeds a threshold value, of the pressure profile to determine whether the valve closure is generated by an inlet or an outlet.

5. The method of claim 2, further comprising identifying a velocity of the valve closure using the start time and the end time to determine whether to analyze the pressure profile.

6. The method of claim 1, wherein the flowline parameter includes any one or combination of an inflow into the flowline, a flowline collapse of the flowline, an effective diameter of the flowline, a deposit in the flowline, a leakage in the flowline, and a failure of the flowline.

7. The method of claim 1, comprising
determining a leveled time, wherein the leveled time is determined as a return to an ambient pressure value identified before the start time;
determining an end time based on the leveled time and the first and second derivatives.

8. A system for inspecting a flowline for carrying a fluid, comprising:
a sensor connected to the flowline and operable to measure a pressure profile of a pressure wave generated in the flowline;
a valve connected to the flowline and operable to generate a pressure pulse in the flowline by closing the valve; and
a processor operable to analyze the pressure profile by calculating a first and second derivative of the pressure profile from the valve closure to determine a parameter of the pressure pulse based on the first derivative and the second derivative, the parameter including at least a reference time of the valve closure;
wherein the sensor is further operable to measure a change in the pressure profile due to a pressure wave reflected back to the sensor from a flowline parameter characterizing the flowline; and
wherein the processor is further operable to determine the flowline parameter and the location of the flowline parameter along the flowline using the parameter of the pressure pulse and a time of flight of the reflected pressure wave from the reference time.

9. The system of claim 8, wherein the sensor comprises a pressure transducer.

10. The system of claim 8, wherein the parameter further comprises any one or combination of a start time of the valve closure, an end time of the valve closure, and a discard time associated with the pressure pulse.

11. The system of claim 10, wherein the processor is operable to:
identify the reference time by finding a peak value of the first derivative following a change in pressure that exceeds a threshold value;
identify the start time by finding a time before the reference time where a change in the first derivative on a time scale meets a first threshold value and a change in the second derivative on the time scale meets a second threshold value;
identify the end time by finding a peak of the second derivative occurring after the reference time; and
identify the discard time by finding an additional separation of the first derivative and the second derivative that meets an additional threshold hold value occurring after the reference time.

12. The system of claim 8, wherein the sensor is positioned at an inlet or an outlet of the flowline.

13. The system of claim 8, wherein the valve comprises a mechanically-closed valve, a valve closed by hand, or any combination thereof.

14. The system of claim 8, wherein the flowline parameter includes any one or combination of an inflow into the flowline, a flowline collapse of the flowline, an effective diameter of the flowline, a deposit in the flowline, a leakage in the flowline, and a failure of the flowline.

15. The system of claim 8, wherein the processor is operable to:
determine a leveled time, wherein the leveled time is determined as a return to an ambient pressure value identified before the start time; and
determine an end time based on the leveled time and the first and second derivatives.

16. The system of claim 8, comprising an actuator mechanically coupled to the valve and configured to close the valve.

* * * * *